Figure 3:
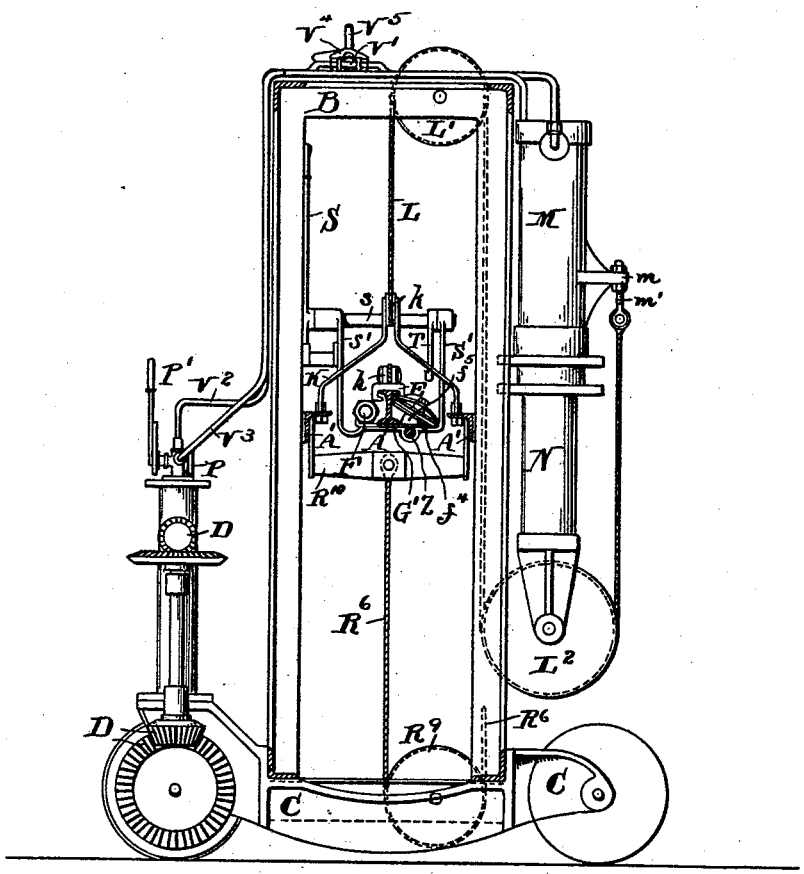

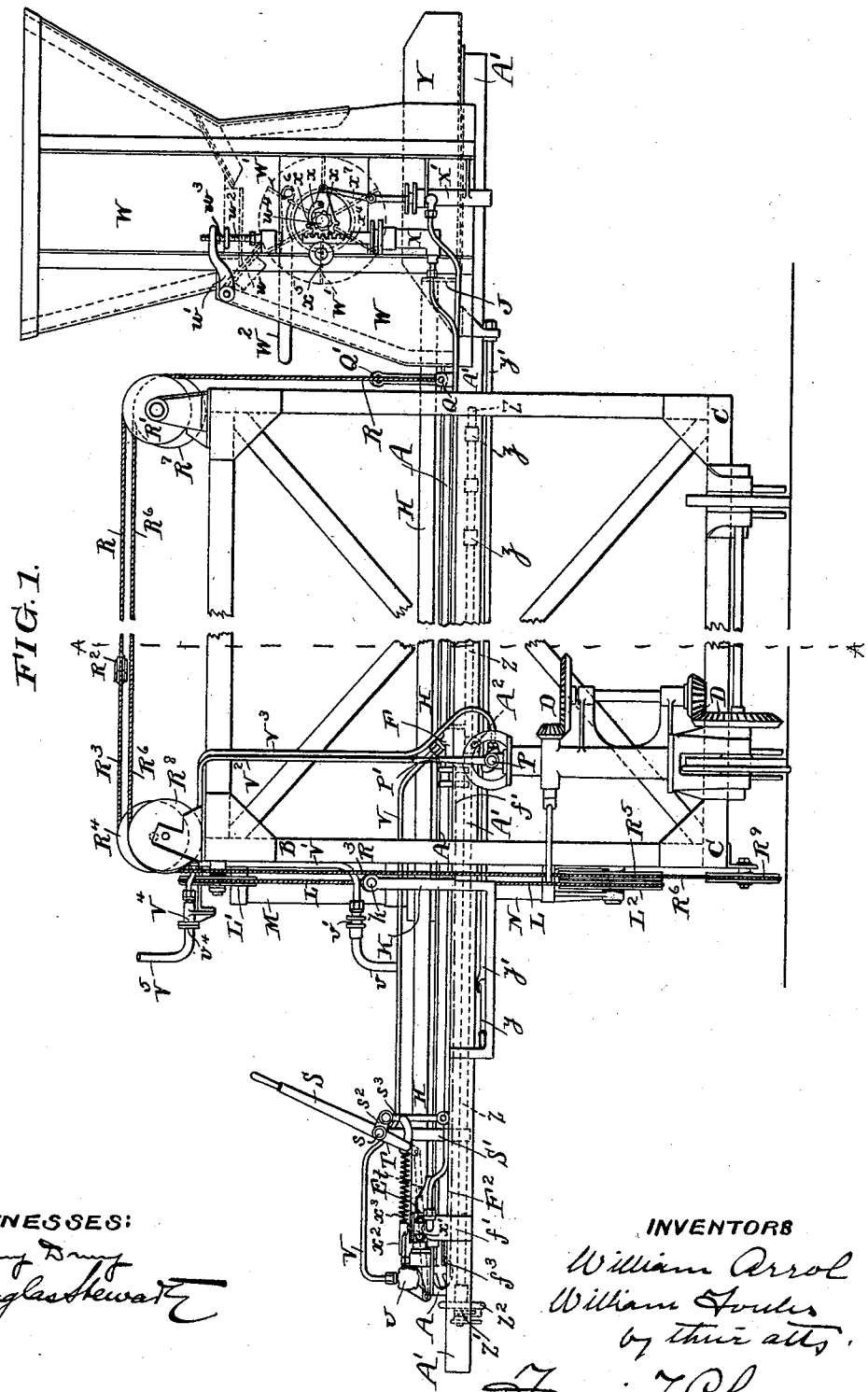

(No Model.) 5 Sheets—Sheet 2.
W. ARROL & W. FOULIS.
APPARATUS FOR CHARGING GAS RETORTS.
No. 498,755. Patented June 6, 1893.
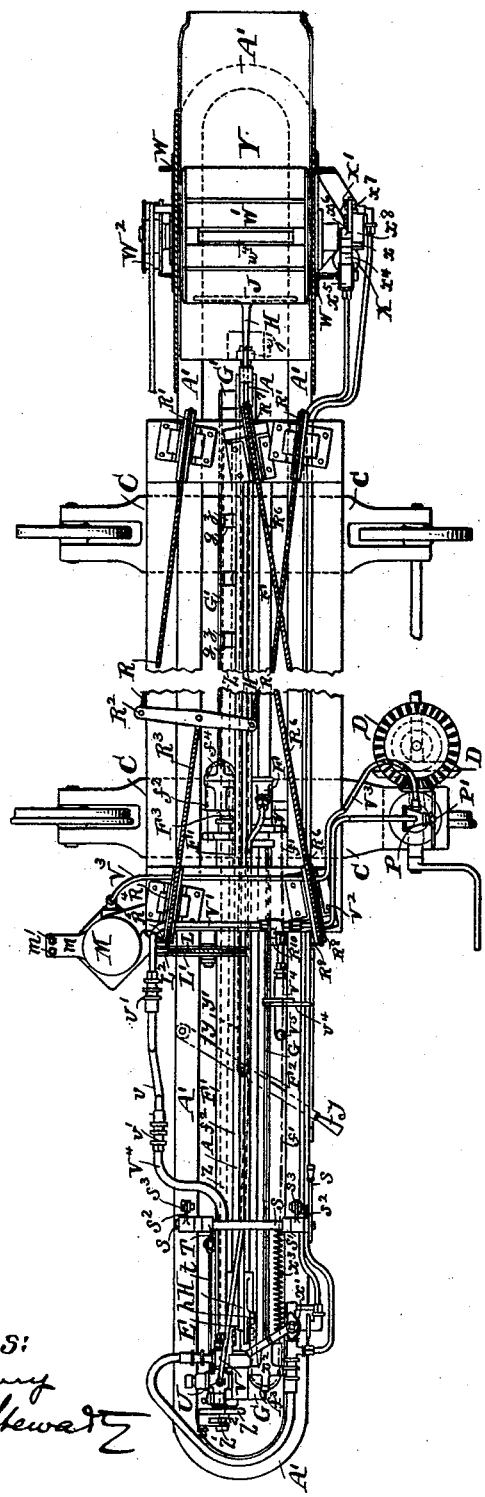
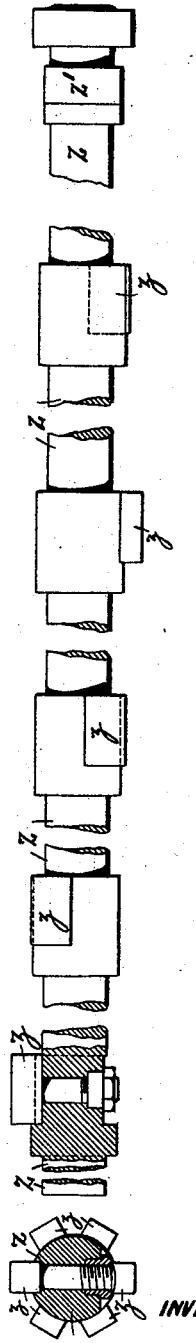
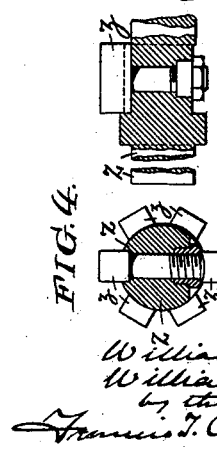
WITNESSES:
INVENTORS (No Model.) 5 Sheets—Sheet 3.
W. ARROL & W. FOULIS.
APPARATUS FOR CHARGING GAS RETORTS.

No. 498,755. Patented June 6, 1893.

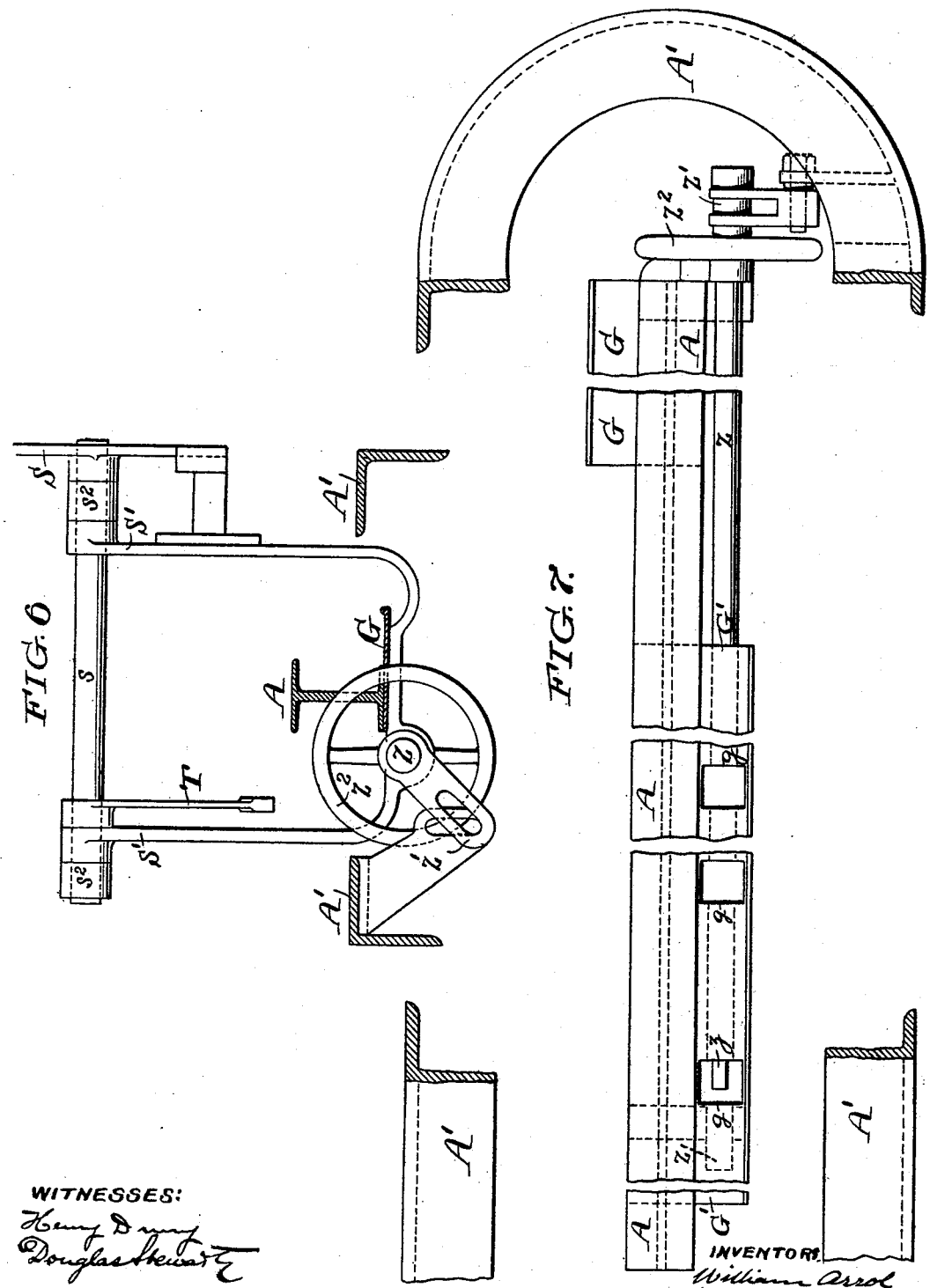

(No Model.) 5 Sheets—Sheet 5.

W. ARROL & W. FOULIS.
APPARATUS FOR CHARGING GAS RETORTS.

No. 498,755. Patented June 6, 1893.

WITNESSES:

INVENTORS:

UNITED STATES PATENT OFFICE.

WILLIAM ARROL AND WILLIAM FOULIS, OF GLASGOW, SCOTLAND.

APPARATUS FOR CHARGING GAS-RETORTS.

SPECIFICATION forming part of Letters Patent No. 498,755, dated June 6, 1893.

Application filed January 18, 1893. Serial No. 458,746. (No model.) Patented in England August 26, 1891, No. 14,440.

*To all whom it may concern:*

Be it known that we, WILLIAM ARROL and WILLIAM FOULIS, subjects of the Queen of Great Britain, residing at Glasgow, in the county of Lanark, Scotland, Great Britain, have invented new and useful Improvements in Apparatus for Charging Gas and other Retorts, (for which we have obtained British Letters Patent No. 14,440, dated August 26, 1891,) of which the following is a true and accurate description, reference being had to the drawings which form part of this specification.

This invention which relates to improvements in apparatus for charging gas and other retorts has for its object to provide an apparatus which will put a charge of coal or other material into the retort in an even layer.

The apparatus constructed according to the present invention may in certain respects be regarded as being based upon the apparatus for stirring and drawing the charge of retorts described in the specification of Letters Patent of Great Britain, No. 12,016, granted to one of us (viz: William Foulis) and dated July 31, 1890; but according to our present invention the apparatus is so constructed that in lieu of the rake rod being raised when going into the retort and depressed when coming out therefrom the rod is depressed when going into the retort and raised when being withdrawn—the action of the apparatus constructed according to our present invention being as follows:—A quantity of coal or other material is allowed to fall from a hopper or chamber (which may or may not be fixed to the machine or apparatus) on to a plate or chute one end of which is secured to the machine the outer end being caused to rest upon the retort mouthpiece while the retort is being charged. The rake (or as we will call it the pusher as it acts rather as a pusher than a rake) is moved inward and being then in its depressed position slides along the aforesaid plate or chute and afterward along the bottom of the retort, pushing the coal or other material before it. The pusher is then elevated and moved outward it being elevated so that it may pass over any coal or other material that there may be in the retort at the rear of the pusher. Another portion of coal or other material is then allowed to fall onto the plate or chute and the operation is repeated until the retort is sufficiently charged. In order to effect the charging so that the charge is properly distributed throughout the length of the retort, the strokes of the pusher are regulated to decrease in length at each successive stroke in charging a retort, the first stroke being say sufficient to move the pusher near to the back of the retort, the next stroke is shorter, the next shorter still and so on, the last stroke being only sufficient to cause the pusher to reach to the back of the mouthpiece of the retort. The difference in the amount of the lengths of the strokes is of course in accordance with the amount of coal or material fed in at each stroke. The alteration in the length of the stroke we prefer to effect automatically and this can be conveniently effected by means of stops provided in the slide which carries the end of one of the rams, these stops being successively brought into action preferably by the same lever which actuates the valve which admits the motive fluid to actuate the rams and which lever also raises and depresses the rod which carries the pusher.

When the hopper or chamber from which the coal or material is fed is attached to the machine, it is preferably fixed to a frame so suspended that it can be raised or lowered to suit different levels of retorts; the said hopper or chamber being always retained in a horizontal position; the said frame may also carry the bar or beam (supporting the pusher rod) which bar or beam is jointed or centered near the center of its length to the said frame.

The supply of coal or material from the hopper or chamber may be regulated so as to be supplied in front of the pusher at the proper times by means of a wheel carrying blades or boxes the said wheel being rotated by means of the movement of the pusher rod or by a lever which may be separate from or the same as that which actuates the valve which operates the pusher. By altering the amount of movement of the said wheel a greater or less amount of coal or other material may be deposited on the plate or shoot and the weight of the total charge put into the retort be varied accordingly. The said plate or shoot is preferably made movable so as to permit of its being brought forward for charging and withdrawn from the retort after the retort has been charged, the movements being effected by a lever or other convenient way. We also provide means whereby the supply pipe by which water or other fluid for operating the apparatus can be readily connected and disconnected from the machine and a good joint obtained. With this object we make the part of the connection attached to the machine in the form of a cup-shaped mouth-piece into which the end of the water supply pipe is fitted a cup leather and brass gland being provided for keeping the joint tight and a pivoted fork lever being employed for holding the parts in position. This last forms however no part of our present invention, and in order that our said invention may be fully understood we shall now proceed more particularly to describe the same, and for that purpose shall refer to the several figures on the annexed drawings, the same letters of reference indicating corresponding parts in all the figures.

Figure 9:
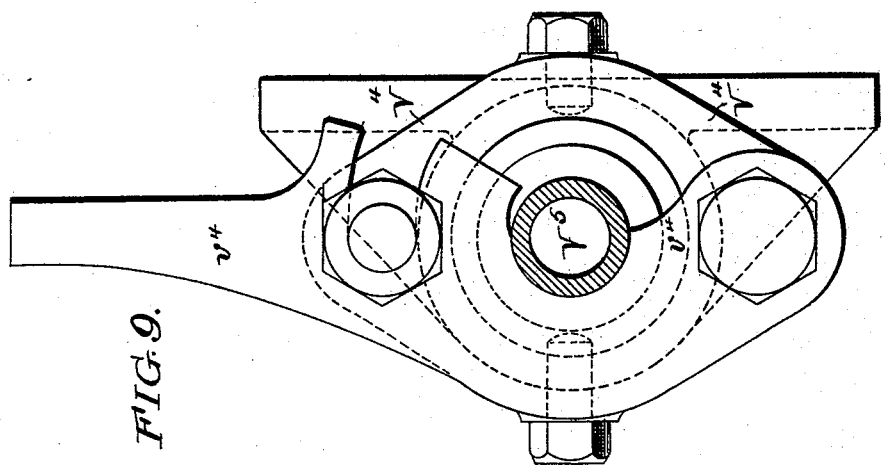
Figure 8:
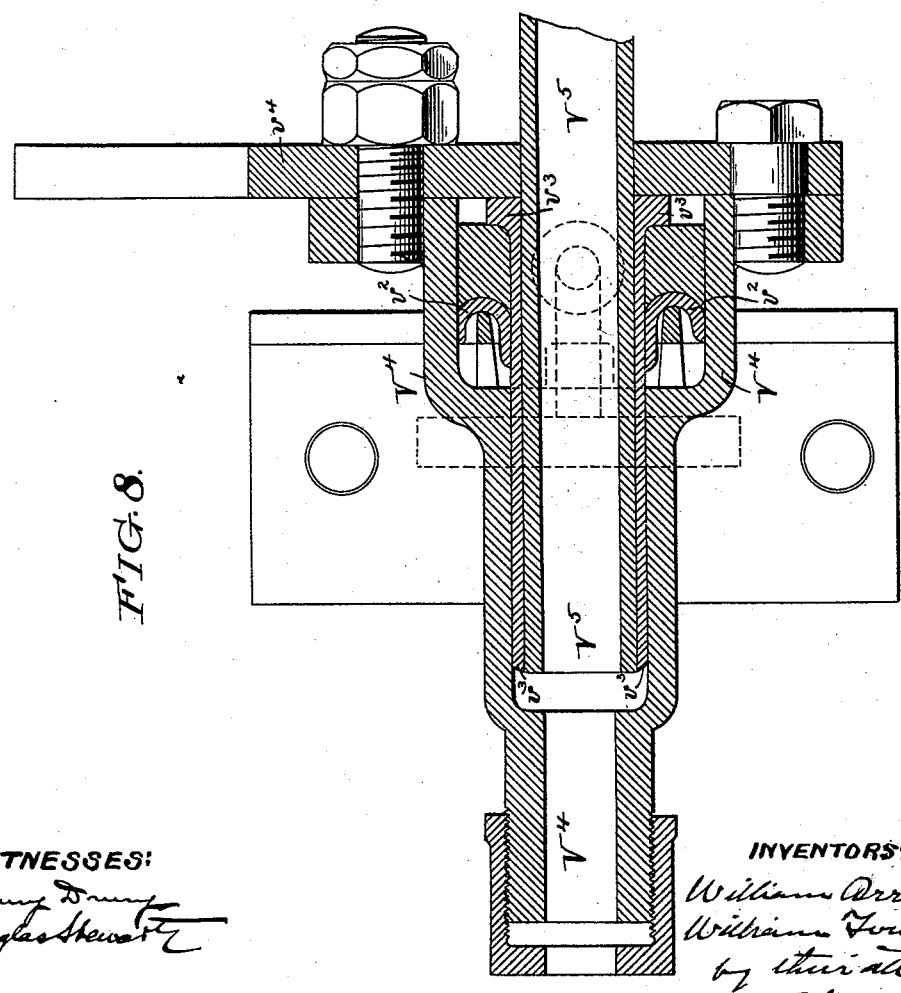

Figure 1 is a side elevation, Fig. 2 a plan, and Fig. 3 a transverse section taken on line A. A. Fig. 1 of the apparatus or machine constructed according to our invention. Figs. 4, 5, 6 and 7 are enlarged detail views showing the shaft and stops for regulating the lengths of the successive strokes of the pusher. Figs. 8 and 9 are sectional and end elevations, drawn to an enlarged scale of the connection between the main water supply pipe and the machine.

In the drawings we have shown the feed hopper W fixed to the front end of the apparatus but if desired it may be separate from the apparatus. The main frame, or as we will now call it, the slide bar A, is preferably constructed of an I iron or steel bar, as shown more particularly in transverse section Fig. 3, and in enlarged section Fig. 6, the said bar is hung or supported near its center in an angle iron or steel frame A' which is suspended at both ends of the carriage C, as hereinafter more particularly described; the said carriage being moved from one retort to another by any suitable means, such as by hand or power gearing D. Upon the said slide bar A, a slipper or carriage E is so mounted that it can be moved backward and forward by means of the cams of two hydraulic cylinders F, F', which are fixed to the slide bar A. The necessary travel may be given to the slipper or carriage E by means of chains or ropes $f'$, $f^2$ each of which is connected at its one end to the front end of one of the cylinders F, F', thence passed around the pulleys $f^3$, $f^4$, which are mounted on the front ends of the cylinder rams $F^2$, $F^3$, the other end of the chain or rope being connected to the slipper or carriage E. The rams $F^2$ $F^3$ are provided near their front ends with guide blocks $f^5$, as shown in Fig. 3, which work in corresponding guide plates G, G', secured to the slide bar A. To the said slipper or carriage E, the back end of the pusher rod H is jointed by the pin $h$ the said rod carrying at its forward end the pusher consisting of the plate J, Figs. 1 and 2.

The frame A' is suspended by means of the carriers K and Q. The top end $k$ of the carrier K is secured to the one end of a raising and lowering wire rope or chain L which is passed around the guide pulley L' mounted on the upright framing B, and around the guide pulley $L^2$, mounted on the lower end of the ram N of the hydraulic raising and lowering cylinder M, and is secured by means of an adjusting screw $m'$ to a snug or projection $m$ on the cylinder M, in such a manner that the frame, slide bar and their connections can be raised or lowered by actuating the valve P by means of the lever P'. The carrier Q is connected to the ends of two wire ropes or chains R, which after passing over the guide pulleys R', are attached to the cross piece or yoke $R^2$ which is connected at its center to another rope or chain $R^3$, which, after passing around the guide pulley $R^4$ mounted on the upright framing B and around the guide pulley $R^5$ mounted on the ram N, is attached by means of an adjusting screw as at $m'$ to the snug $m$ of the cylinder M, so that the frame, slide bar, hopper and connections are raised or lowered at the same time by the one cylinder M. The frame A' is also provided with a balancing chain or rope $R^6$ which, after being secured at its one end to the top of carrier $Q^2$, (which is secured near the front end of the frame A') passes around the guide pulleys $R^7$, $R^8$ and $R^9$ and is secured to the cross piece or yoke $R^{10}$, which is connected at its ends to the under side of the frame A', preferably near its center as shown in Fig. 3 so as always to keep the various parts in their relative positions to each other. The slide bar A is connected to the frame A', near its center, by means of the carrier $A^2$, (Fig. 1.) in such a manner as to permit of the slide bar A with the pusher rod H and pusher J, being raised and lowered at its ends by means of the operating handle S, which is secured to a cross shaft $s$ carried by the top ends of an inverted saddle bracket S', (shown more particularly in Figs. 3 and 6) secured near the rear end of the slide bar A. The said cross shaft $s$, has mounted on it a lever or arm T whose lower end is connected to the regulating or reversing valve U by means of a rod or link $t$, the said valve U being fixed to the cylinder F' and connected by means of a pipe V to the cylinder F actuating the pusher J, and supplied with water under pressure by means of the pipe V', a branch $V^2$ from which also supplies the raising and lowering valve P which is connected to the cylinder M by piping $V^3$. The said pipe V' is provided with a flexible tube $v$ which is connected at each end to the metallic joints $v'$ of the pipes V', so as to allow for the raising and lowering of the frame A' and its connections. The said shaft $s$ has also levers or arms $s^2$ mounted on it, the ends of which are connected to pivoted links $s^3$ the lower ends of which are pivoted to the frame A' so that when the lever S is moved the valve U is operated and the slide bar raised or lowered as required.

To the front end of the frame A' the hopper W is fixed, having an adjustable hinged agitator $w$, which can be adjusted by means of the lever $w'$, hand screw $w^2$, and nuts $w^3$. Underneath the said agitator $w$, are mounted blades W' constituting a wheel or circular series of boxes on a cross shaft $w^4$ carried in bearings in the lower frame work of the hopper. The said shaft $w^4$ has a continuous rotary motion imparted to it from the reciprocating motion of the rams of the two hydraulic cylinders X, X' by means of the ratchet and pawl arrangement $x$, the said cylinders being mounted on the framework of the hopper W and supplied with water by means of the valve $x'$, which is actuated by the lever $x^2$, and is kept in its normal position by means of the spring $x^3$. When the valve $x'$ is in this position the supply of water is shut off from the cylinder X, which is then open to the exhaust. The lever $x^2$ is so mounted that the slipper or carriage E, comes in contact with it when near the end of its backward stroke thereby opening the cylinder X to the water pressure and so causes the ram to rise up and so turn the blades W' by means of the rack $x^4$, which is on the top end of the ram guided by the roller $x^5$; the said rack engaging with a spur segment $x^6$ mounted loosely on the shaft $w^4$, of the blades W'; the said segment $x^6$ being connected by means of the link $x^7$ with the upper end of the ram of the cylinder X' as shown. In cylinder X', which is of smaller diameter than cylinder X, the water pressure is constant so that when the water is free to exhaust from cylinder X the ram in cylinder X' forces up the lever or segment $x^6$ with the pawl $x^8$, and so causes the ram of the cylinder X to be forced back into position for the next stroke, so that when the rack $x^4$ ascends, the wheel W' is turned through a part of a revolution and therefore a portion of coal or other material in the box W' is discharged onto the plate beneath. The distance of travel of said rack $x^4$ is adjusted by means of the screw $w^2$. The revolving wheel of blades W', is also provided with a brake pulley, strap and weighted lever $W^2$ so as to prevent the wheel from turning too far.

In order to receive the charge of coal or other material from the wheel W', we mount on the front end of the frame A, and underneath the blades W' a plate Y upon which the pusher J travels. The said plate has a backward and forward movement given to it by the handle or hand lever $y$, and rod $y'$ so as to enable the plate to be introduced into the mouth of the retort when the retort is to be charged and to be withdrawn therefrom after the retort has been charged.

In order to automatically regulate the travel or length of stroke given to the pusher rod H and pusher J, we mount underneath the slide bar A, a revolving shaft Z, (shown in detail Figs. 4, 5, 6 and 7,) having a number of stops or projections $z$, which are at different distances along the said shaft Z and radially out of line with each other, so that on the shaft Z being partly turned, through the medium of the ratchet and pawl arrangement Z' (shown in detail Figs. 6 and 7) which are brought into play through the raising and depressing of the rear end of the slide bar A, the various stops $z$ coming into the path of ram $F^3$ in succession and so regulate or alter the stroke given to the pusher J, as the ram will be stopped in its charging stroke at a distance which is dependent upon which of the stops $z$ is in its path. The pawl Z' is returned to its normal position on the reverse movement of the slide bar A. The said stops $z$ work through openings $g$ (shown more particularly in Figs. 2 and 7) formed in the guide plate G' and may be actuated by hand when desired by means of the hand wheel $Z^2$ provided on the rear end of the said shaft Z.

For connecting or disconnecting the water supply pipe, we form on or attach to the main pipe V', of the machine a cup shaped mouth piece $V^4$, shown in section and end elevation in Figs. 8 and 9, in which is contained a cup leather $v^2$ and brass gland $v^3$ so as to receive the end of the main supply $V^5$ and so form a tight joint the said parts being locked in position or unlocked by means of the pivoted lever $v^4$.

While we have described the rake or pusher the meter and the frame all operated by fluid pressure rams, we do not wish to be considered as limiting ourselves to that form of motor. It may for instance be more convenient to raise the charging apparatus to the level of the retort opening by means of a crank turned by hand rather than by the ram N in the cylinder M, and the rake and hopper may be actuated by any other power than a hydraulic motor.

The action of the machine is as follows: When it is required to charge a retort the operator moves the machine (along the rails laid for the apparatus to travel upon) by means of the gearing D until it is opposite the retort to be charged, he then operates the lever P' and so raises or lowers the frames until the plate Y is on a level with the mouth of the retort. He then operates the lever $y$ which causes the plate Y to enter the mouth of the retort and rest thereon. He then operates the lever S which by a single operation causes a quantity of coal to be delivered from the revolving wheel of blades W' on to the plate Y, the slide bar to be depressed at its front end, and the rams $F^2$ and $F^3$ to act so as to move the pusher J forward carrying the charge before it into the retort well toward the back thereof. After the pusher J has reached the end of this stroke which is determined by the outermost of the series of stops the operator reverses the lever S and by so doing raises the pusher and withdraws it from the retort. After the pusher rod reaches the end of its backward movement the operator repeats the operations, and the shaft Z is partially revolved so as to bring the next stop $z$ into position for terminating the next forward stroke of the pusher J as hereinbefore described the stops being successively brought into position causing the pusher to travel a less distance into the retort at each successive stroke so that the successive charges (which are deposited by the wheel W' before the pusher prior to each stroke) are pushed to a less and less distance into the retort and so evenly spread therein. When the retort has been fully charged the operator again actuates the lever $y$ and withdraws the plate Y from the retort when the machine is ready to be moved to another retort.

Having now described our invention, what we claim as new, and desire to secure by Letters Patent, is—

1. In an apparatus of the character described the combination with a frame of a bar pivoted thereon, a rake or pusher mounted on said bar and a motor for reciprocating said rake or pusher substantially as described.

2. In an apparatus for charging gas and other retorts the combination with a rake or pusher and a motor for reciprocating it, of mechanism operating to deliver a regulated quantity of coal or other material in the path of the rake when it is substantially in its rearmost position as and for the purpose specified.

3. In an apparatus for charging gas and other retorts the combination with a rake or pusher, and a motor for reciprocating it, of means, as stops $z$ for varying the lengths of successive strokes of the said rake or pusher while a retort is being charged as and for the purpose specified.

4. In an apparatus of the character described the combination with a rake or pusher and a motor for operating it, of mechanism operating to deliver a regulated quantity of coal or other material in the path of the rake and means, as stops, for varying the length of the strokes of the rake or pusher while a retort is being charged.

5. In an apparatus of the character described the combination with a rake or pusher, of a motor for reciprocating it, and means for raising and lowering the said rake or pusher, whereby the rake may be depressed to make a forward or charging stroke and raised to make a backward stroke substantially as and for the purpose specified.

6. In an apparatus of the character described the combination with a frame as A' and means for raising and lowering it, of a pivoted slide bar, a rake or pusher mounted thereon, rams F F' for reciprocating the rake or pusher, and means operatively connected with the pivoted slide bar whereby it may be tilted substantially as described.

7. In an apparatus of the character described the combination of a frame with a hopper mounted thereon and so constructed as to deliver a regulated quantity of coal or other material, a rake or pusher, a motor for reciprocating the rake or pusher so that its line of travel will be beneath the hopper and stops to regulate the length of stroke of the rake.

8. In an apparatus of the character described the combination with a rake or pusher constructed so as to be capable of longitudinal movement, of a hopper adapted to deliver a regulated quantity of coal or other material, and a motor or motors for operating the hopper and the rake whereby the hopper may be caused to deliver the desired quantity of coal in the path of the rake as it makes its forward stroke.

9. In an apparatus of the character described the combination with a plate constructed to enter the mouth of a retort or other furnace to be charged, of a meter operative to deliver a regulated quantity of coal or other material onto the plate, a rake or pusher moving over the surface of the plate, and a motor or motors operating to actuate the hopper and rake relatively to each other in such a manner that a charge of coal is deposited on the plate in the path of the rake when the said rake is substantially in its rearmost position.

10. In an apparatus of the character described the combination with a hopper, of a meter for delivering a regulated amount of coal or other material, a rake or pusher, fluid pressure motors for operating the meter and for reciprocating the rake or pusher and means for charging gas and other retorts simultaneously operating the valves of the above mentioned motors in such a manner that the meter will deliver the desired quantity of coal in front of the rake as it makes a forward stroke.

11. In an apparatus for drawing the charge from, and stirring gas retorts the combination with a pivoted bar, of a rod as F mounted thereon, a motor for tilting the bar and means for reciprocating the rod substantially as and for the purpose specified.

12. In an apparatus for charging gas and other retorts the combination with a frame and a bar pivoted thereon, of a rod as F mounted on said pivoted bar for tilting the bar and means for reciprocating the rod so connected as to be operated simultaneously by the movement of a suitable actuating device as lever S, substantially as and for the purpose specified.

13. In an apparatus of the character described the combination with a frame, of a bar pivoted thereon, means as the lever S for tilting the bar, a rod as F mounted thereon, and a fluid pressure motor for actuating the rod the admission valve of said motor being operated by the bar tilting mechanism.

14. In an apparatus of the character described the combination with a frame and means for raising and lowering it, of a bar pivoted thereon, means as the lever S for tilting the bar, a rod as F mounted on said pivoted bar and a fluid pressure motor for actuating the rod whose admission valve is operated by the bar tilting mechanism.

15. In an apparatus of the character described the combination with a frame and means for raising and lowering it, of a bar pivoted on said frame, a rod mounted on said bar, fluid pressure motors for reciprocating said rod, a lever for tilting the pivoted bar, said lever being operatively connected to the admission valves of the motors.

16. In an apparatus of the character described the combination of a frame, a bar pivoted on said frame, a rod mounted on said bar, and a motor for reciprocating said rod, substantially as and for the purpose described.

WILLIAM ARROL.
W. FOULIS.

Witnesses:
DAVID T. MACLAY,
Of 169 West George Street, Glasgow, Solicitor.
JAS. HENDERSON,
Of 169 West George Street, Glasgow, Solicitor's Clerk.